UNITED STATES PATENT OFFICE.

HENRY M. GOODMAN, OF LOUISVILLE, KENTUCKY.

METHOD OF SEPARATING ORGANIC MATERIALS FROM AQUEOUS LIQUIDS.

966,196.　　　　　　　　Specification of Letters Patent.　　Patented Aug. 2, 1910.

No Drawing.　　　　Application filed April 3, 1905.　Serial No. 253,710.

*To all whom it may concern:*

Be it known that I, HENRY M. GOODMAN, a citizen of the United States, residing at Louisville, in the county of Jefferson and State of Kentucky, have invented a new and useful Method of Separating Organic Materials from Aqueous Liquids, of which the following is a specification.

This invention relates to method of separating organic materials of mixed nature from distillers' slop and other aqueous fluids having an acid reaction.

The invention consists in the method of operation hereinafter recited, whereby organic materials of a mixed character contained either in a state of solution or in suspension in water or other aqueous fluids, having an acid reaction, may be separated, removed and recovered.

The invention further consists in coagulating the organic materials contained in distillers' slop and other aqueous fluids, having an acid reaction, and in the manner hereinafter recited to effect separation of such organic material and recovering the same.

The invention consists in employing a soluble salt of iron either with or without the aid of heat to effect the coagulation of organic materials contained in distillers' slop and other aqueous liquids, having an acid reaction, either in solution or suspension, in order to separate and recover same.

Other objects and purposes of the invention will appear more fully hereinafter.

A mixture of organic materials such as various fats or their decomposition or saponification products, proteids, coagulated or uncoagulated, such as globulins, vitellins, albumins, albuminates, peptones, organic acids, carbo-hydrates, and various decomposition products is generally of an acid reaction, and the special purpose of the present invention is to extract, separate, or remove and recover these solids or organic materials from the water or other aqueous fluids in which they are contained, either in a state of solution or suspension, in as unaltered, pure and free a condition as it is possible to do so. This extraction cannot be accomplished by mere neutralization alone for the reason that the alkali employed to effect neutralization and precipitation, only precipitates the albuminates in an uncoagulated condition, and these albuminates when precipitated will again pass into solution, if the liquid from which they are being precipitated becomes too alkaline. Moreover, during the neutralization the fats contained in the aqueous fluids undergo saponification more or less complete, and the fatty acids set free combine with the alkali to form soaps, which are soluble or insoluble according to the alkali used and the many and varied reactions occurring between the alkali and the different organic substances, all at the same time, rendering the complete extraction of such organic materials under these circumstances in an unaltered condition a practically absolute impossibility.

In accordance with this improved method and invention, no effort is made to secure neutralization in the beginning of the operation. On the contrary and in accordance with the invention, there is added to the distillers' slop or other aqueous fluid of similar character containing the organic materials to be extracted, separated and recovered, a soluble salt of iron. It has been found that by treating distillers' slop containing the organic materials to be extracted, and having an acid reaction, with a soluble iron salt, coagulation of the organic materials contained in the aqueous fluid under treatment begins at once. It has been found in practice that any soluble salt of iron may be employed for the purpose of coagulating all the proteids contained in the acid liquid that will coagulate from the acid menstruum under the action of the iron salt, and success has been attained by employing for this purpose ferrous or ferric sulfate, chlorid, nitrate, or acetate, and by reason of the cheapness and greater efficiency it is preferable to employ one or the other of these salts of iron, and in the order named, and in the proportion of about thirty drops to a teaspoonful, more or less, of a saturated solution of the iron salt, including Monsel's solution to one gallon of aqueous fluid such as distillers' slop or the waste liquor pressed from brewers' spent grains. It has also been found that the coagulation of the organic materials contained in the aqueous fluid to which the soluble iron has been added is materially aided, if the liquid is treated while hot or if cold, heating the liquid to a temperature between 160° and 212° Fahr.

The coagulation of the albuminous organic matters by the iron salt is just as pronounced if the distillers' slop is treated in the cold but the time required is longer, whereas if the liquid is warmed the separation of the coagulum is more rapidly accomplished. The fats and fatty proteids are partially removed from the liquid by being absorbed by the coagulated proteids. After standing a short time the coagulated organic materials may be separated or removed and recovered from the distillers' slop in any suitable or convenient manner, as by decantation, filtration or the use of mechanical appliances. The coagulum recovered by the addition of the iron salt amounts to between three to four and one half ounces per gallon and is composed of proteids in organic combination with the iron, and fats. This constitutes the first step of this improved process and if by reason of the expense involved it becomes desirable to stop at this point the filtrate may be thrown away. After the removal of the coagulum produced by the addition of the iron salt to the distillers' slop, having an acid reaction, a considerable amount of proteid material and fats is still retained in the aqueous fluid, amounting to from ½ to 1 ounce per gallon. Another portion of the iron salt may then be added to the acid filtrate, obtained from the first step, and this fluid neutralized by the addition of an alkali, and in about the proportion of four pounds, more or less of the alkali, as caustic potash, or soda or lime to 1,000 gallons of the aqueous fluids, as distillers' slop or the waste liquids from brewers' spent grains.

Neutralization of the acid filtrate left after the first addition of the iron salt causes precipitation of the remaining proteid materials, but the addition of the iron salt previous to neutralization causes an alteration of the proteid molecule and the percipitation of the proteid materials under such circumstances is more prompt and permanent. The precipitate so formed can now be removed and recovered by filtration or decantation. This constitutes the second and final step of this improved process. The strongly acid filtrate remaining after the first step is still cloudy whereas the neutral or faintly acid or faintly alkaline filtrate remaining after the second step is as clear as spring water and shows entire removal of proteid material, except perhaps the presence of an exceedingly small amount of peptone or albumoses as shown by a delicate response to the Bieuret reaction.

From the foregoing description, it will be seen that the soluble molecules of the albuminous organic materials contained in the acid distillers' slop become altered by the use and action of the iron salt, in the first step producing a true coagulation of the proteid material from the acid liquid, and in the second step enabling the alkali to form a more permanent percipitate from the acid fluid.

The process above described, while applicable generally to any waste liquids, having an acid reaction, holding in solution or suspension the solid materials herein above set forth, is particularly adapted to the treatment of distillery slop and may be applied to the liquid pressed out of brewers' spent grains, the liquid left in glucose refuse, starch refuse, and the liquid pressed from cossettes or beet pulps. The process may be applied to distillery slop before the removal of the solid remnants of grain by means of filter presses, roller presses, or other mechanical devices, but it is preferred to apply the process to the liquid at present passing the sieves and the presses, and which is ordinarily either thrown away or sold to dairymen as food for cattle. This liquid contains the most valuable portion of the nutriment and it is to this liquid that this method is applied in order to recover this additional nutriment in a dry state, in which form it is especially valuable as a food for dairy cattle, as it adds a value of from 30 to 40 per cent. to the dried grains at present extracted from distillery slop. The organic matter extracted by the above process consists almost entirely of coagulated proteids and fats, and by adding this material to the grains at present extracted from distillery slop by the present purely mechanical processes, there is added not only to the nutritive value of the dried grains, but the amount of material recovered is greatly increased.

Repeated experiment has demonstrated and has conclusively shown that only so much of the soluble iron salt (from ½ to 1 teaspoonful of a saturated solution, or its equivalent, to one gallon of distillery slop, or one gallon of the liquid pressed from brewers' spent grains) is necessary to coagulate the coagulable albuminous matters contained in the acid liquid. Any excess of the iron salt above the said quantity does not cause coagulation of the entire amount of the albuminous organic matters in the acid solution. If less than the necessary amount of the iron salt is used, or if just sufficient is used to coagulate all of the coagulable organic matters in the acid solution, tests applied to the filtrate will not demonstrate the presence of the iron salt. Whereas, if an excess of the iron salt be used over and above the amount required to coagulate the coagulable organic matters contained in a given amount of the acid slop, then chemical tests applied to the acid filtrate will demonstrate iron remaining in solution in the filtrate. It is therefore evident that in the first step only a certain amount of the albuminous organic matters in the acid solution becomes coagulable under the influence of the iron salt. The albuminous matters remaining in solution after the coagulable albumins (rendered coagulable by action of the iron salt) require for their removal precipitation by neutralization, and the second addition of the soluble iron salt prior to neutralization produces a more permanent precipitation of the remaining albuminous organic matters, resembling in many respects a true coagulation.

What is claimed as new is—

1. The method of separating albuminous organic materials from distillers' slop having an acid reaction which consists in coagulating the albuminous organic materials contained therein and removing part of the albuminous materials therefrom, then adding a soluble salt of iron thereby forming a permanent precipitate of the remaining albuminous matters, then neutralizing the solution with an alkali and separating the coagulum and recovering the same.

2. The method of separating organic materials from distillers' slop having an acid reaction which consists in coagulating a portion of the albuminous organic materials thereof by the addition to such fluids of a soluble salt of iron, then separating and recovering the resultant coagulum by filtering the mass, then again treating the filtrate with a soluble salt of iron whereby a further proportion of the albuminous organic materials will be coagulated and finally separating and recovering the second resultant coagulum.

3. The method of separating albuminous organic materials from distillers' slop having an acid reaction which consists in coagulating part of albuminous organic materials contained therein by the addition to such fluid of a soluble salt of iron, filtering and recovering the coagulum, then adding a second portion of the soluble iron salt to the acid filtrate, then neutralizing and thereby precipitating the albuminous organic materials, then filtering and recovering the final coagulum.

In witness whereof, I have hereunto set my hand this 20th day of March, 1905, in the presence of the subscribing witnesses.

HENRY M. GOODMAN.

Witnesses:
HUGHES MOORE,
J. W. BILES.